Sept. 13, 1955     W. GREGG     2,717,773
AIR COOLER
Filed Aug. 25, 1952     3 Sheets-Sheet 1
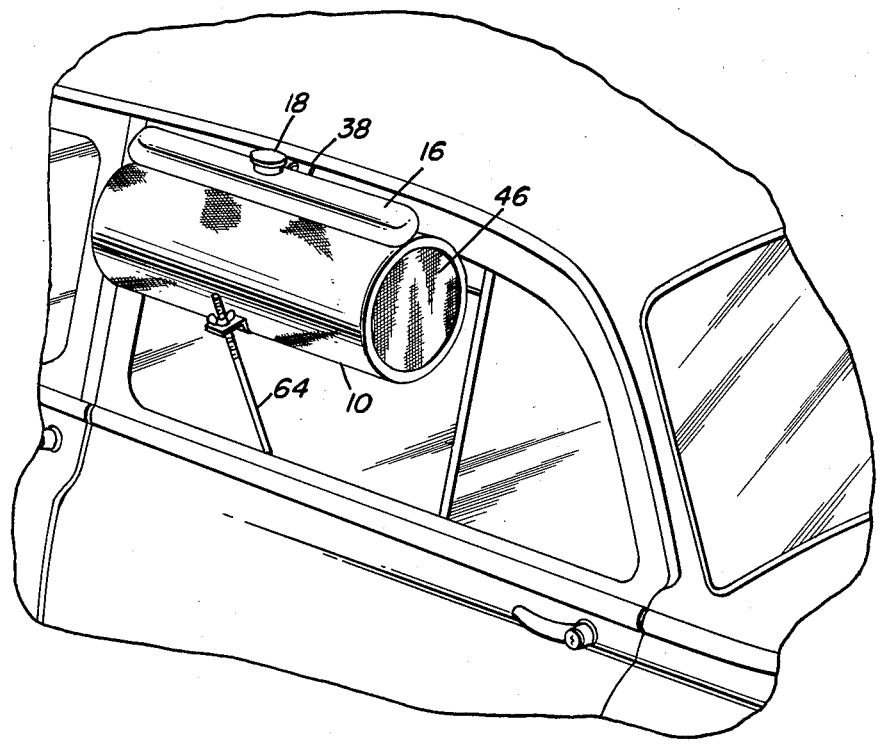
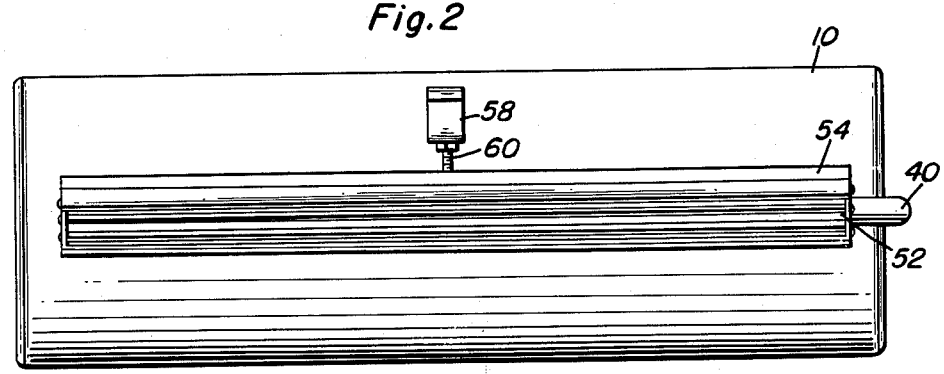
Wallace Gregg
INVENTOR.

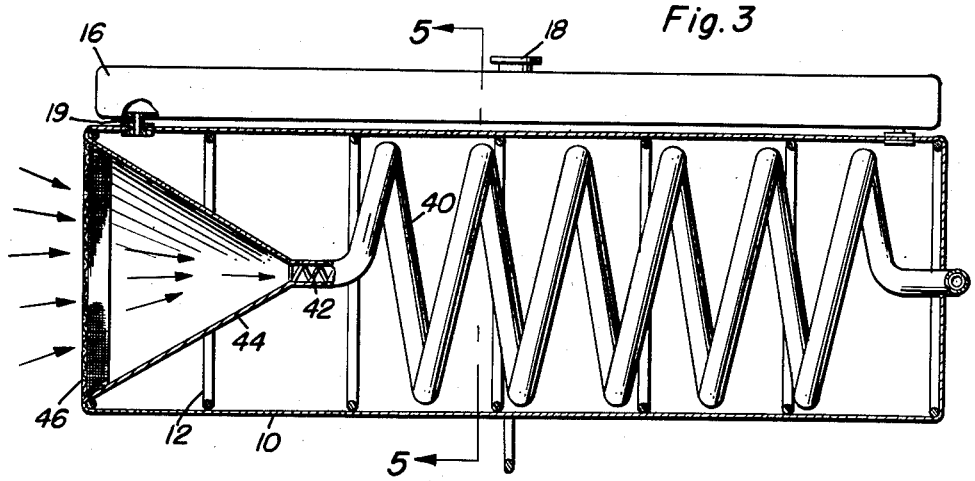
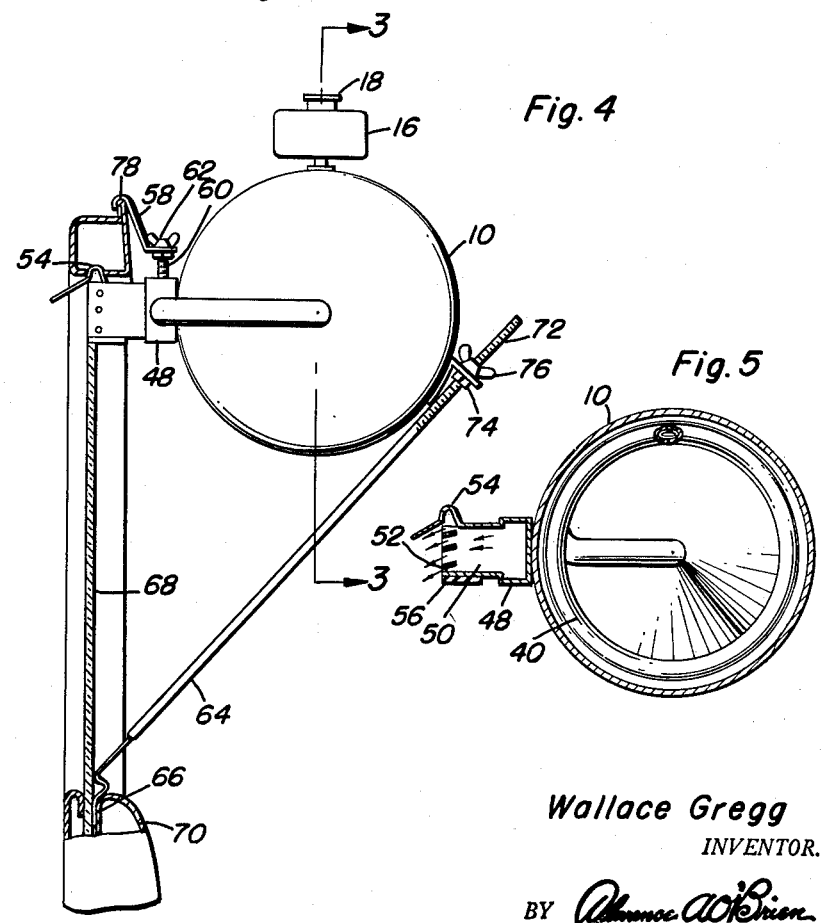

Sept. 13, 1955     W. GREGG     2,717,773
AIR COOLER

Filed Aug. 25, 1952     3 Sheets-Sheet 3

Wallace Gregg
INVENTOR.

2,717,773
Patented Sept. 13, 1955

2,717,773
AIR COOLER
Wallace Gregg, Los Angeles, Calif.

Application August 25, 1952, Serial No. 306,197

1 Claim. (Cl. 261—102)

This invention relates to an air cooler and particularly to an evaporation cooled device for producing cool water and means for transferring the heat from a stream of air into cool water.

It has long been known that water may be cooled by evaporating a portion thereof. Most cooling systems utilize evaporation of water in some form or other to produce the necessary cooling action. One of the best known and ancient cooling systems utilizes an unglazed earthenware jug or semi-porous earthenware urn with water on the inside so that the surface of the jug is moistened with the water inside so that the passing dry air and particularly warm dry air will evaporate the moisture from the exterior surface of the jug and produce a cooling effect on the water in the jug.

The present invention takes advantage of this known cooling effect of evaporation to produce a cool body of water and an air conduit is passed through the body of water which in turn gives up most of its heat to the cool body of water so that a cool stream of moist air will be produced thereby.

The apparatus for carrying the invention into practice comprises a closely woven canvas container of a semi-pervious type in which water on the interior of the container will maintain the external surface of the container in a moist condition. The air conduit is also preferably constructed as a canvas tube and the hot air passing through the canvas tube further causes evaporation so that the air passing through the tube will be readily cooled and moistened so that cool moist air will be delivered from the output end of the device. The cooling device is particularly adapted to be mounted in the window either of vehicles or buildings with the air outside of the vehicle or building being passed through the air conduit and delivered through the window inside of the building or vehicle. When the device is utilized on a moving vehicle the motion of the vehicle will generally cause sufficient flow of air through the conduit to maintain the interior of the vehicle in a comfortable condition. However, when the device is applied to a building particularly a building where there is little air flow adjacent thereto it is frequently necessary to produce an artificial wind stream through the container and for this purpose a fan, such as an electric fan is usually employed.

It is accordingly an object of the invention to provide an improved air cooler.

It is a further object of the invention to provide an air cooler utilizing the evaporation of a film of moisture on the exterior of the device to maintain the cooling.

It is a further object of the invention to provide an air cooler particularly adapted to be mounted in a window.

Other objects and many of the attendant advantages of the present invention will be apparent from the following detailed description taken in conjunction with the accompanying drawing in which:

Figure 1 is a perspective view of an air cooler mounted on a vehicle;

Figure 2 is an enlarged elevation of the discharge side of the cooler;

Figure 3 is a sectional elevation through the cooler taken substantially on the plane indicated by the line 3—3 of Figure 4;

Figure 4 is a rear elevation of the cooler;

Figure 5 is a cross section through the cooler taken substantially on the plane indicated by the line 5—5 of Figure 3;

Figure 6:
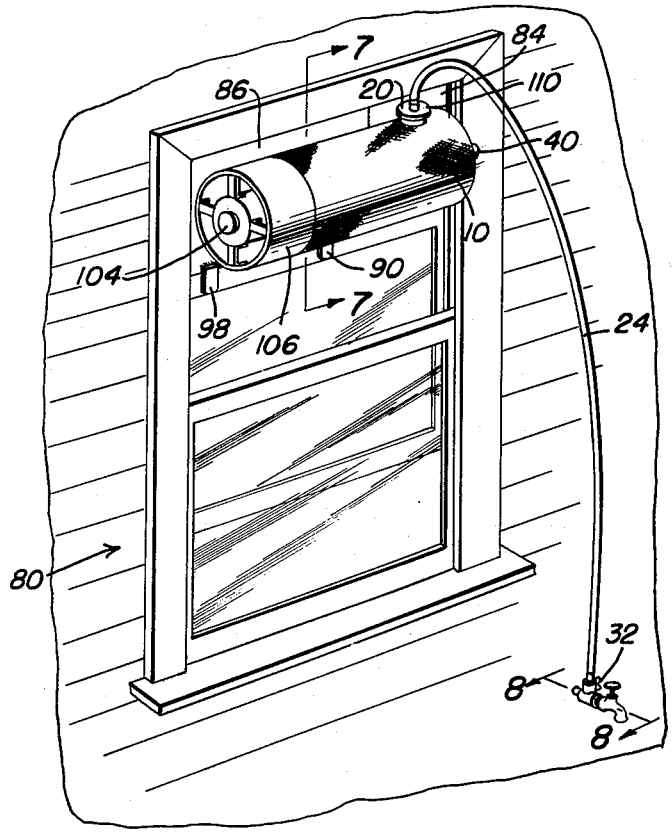
Figure 6 is a perspective view of the air cooler mounted on the window of a building.
Figure 7:
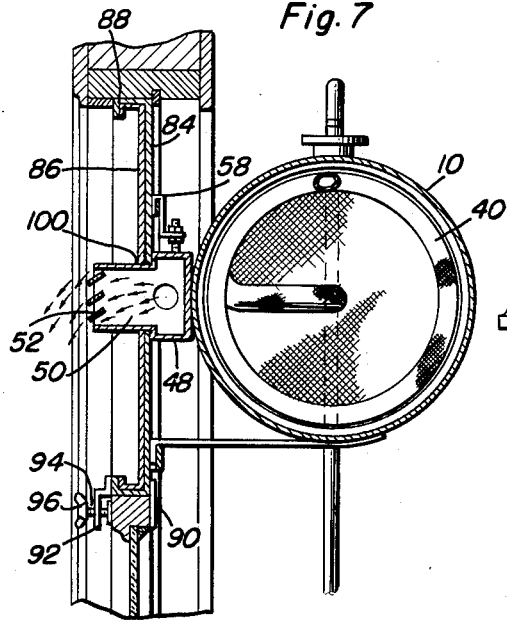
Figure 7 is a cross section through the window mounting taken substantially on the plane indicated by the line 7—7 of Figure 6.
Figure 8:
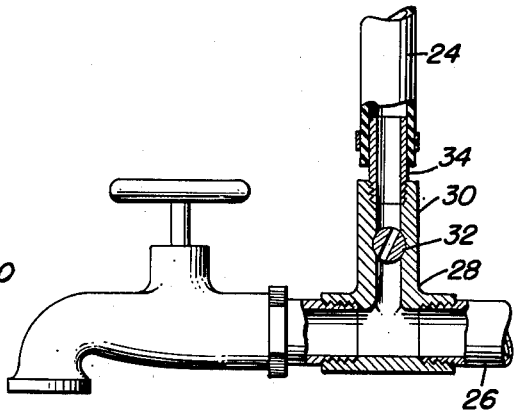
Figure 8 is a view partially in section of the supply valve for the cooler.

In the exemplary embodiment of the invention a substantially cylindrical container 10 is constructed of semi-pervious or semi-porous material such as closely woven canvas. The container 10 is provided with a plurality of ribs 12 preferably constructed of metal rings which are secured to the interior surface of the container 10 and maintained in the standard substantially cylindrical condition. A filling opening 19 is provided on the top surface of the container 10 so that suitable cooling fluid preferably water may be introduced therein so that the exterior surface of the container 10 will be maintained in moist condition. When the device is to be mounted on an automotive vehicle or other vehicle or any place where there is no supply of water a water reservoir 16 will be mounted on the top surface of the container 10 and will preferably be provided with a filler cap 18. When a source of water pressure or water supply is available the reservoir 16 may be dispensed with and the filler cap 18 directly connected to the water inlet 19 and a supply may be completely and constantly furnished thereto by means of a conduit such as the hose 24, see Figures 6 and 8, which may be connected into a suitable pressure supply system such as the pipe 26. A fixture 28 is preferably connected in the line 26 having a laterally extending connection 30 in which is mounted a valve 32. A nipple 34 is connected onto the portion 30 so that the flexible conduit 24 may be readily connected to a laterally extending connection. An air conduit 40 is preferably constructed as a canvas tube or hose-like member and is arranged in spiral formation within the container 10. In order to maintain the conduit 40 in distended connection a spiral reinforcing spring 42 is preferably introduced into the conduit 40. An air intake for the tube 40 comprises a substantially expanded member 44 such as a funnel-shaped wind scoop having the large end substantially identical in size with the end of the member 10.

In order to prevent undesirable articles such as leaves, trash, insects or other items from entering into the conduit 40 and either stopping it up or passing therethrough and being objectional at the other end of the device the screen 46 is preferably secured in the open end of wind scoop 44.

An air outlet housing 48 is arranged in parallel relation to one side of the container 10 and the conduit 40 connects thereinto. A diffusing chamber 50 is connected to the discharge chamber 48 and is preferably utilized for mounting the discharge chamber on the window or other portion of the vehicle or building on which the device is to be used. Preferably the diffusing chamber 50 is provided with louver members 52 which serve to either close the outlet of the diffusing chamber 50 or direct the stream of air passing therethrough in any desired direction.

When the cooling device is to be mounted in the window of a vehicle the diffusing chamber 50 is preferably provided with an upstanding ledge 54 adapted to fit into the window receiving slot in the top of the door. The bottom portion of the chamber 50 is provided with a felt cushion 56 which is adapted to contact the top of the glass or other window member in the door. In order to support the weight of the device a hook member 58 is attached to the housing 48 by means of an adjustable connection such as the screw 60 controlled by wing nut 62. To further stabilize and support the device 10, a brace member 64 is provided with a spade-like end 66 which is adapted to fit between the window member 68 and the window housing 70. The top end of the brace 64 is provided with a threaded portion 72 and lock nut 74 and wing nut 76.

The device 10 may then be readily mounted on the door of a vehicle by hooking the hook 58 over the top rim 78 of the door of the vehicle adjusting the member 54 into the glass slot in the bottom of the door top and adjusting the wing nuts 62 until the device is in suspended relation. The spade-like member 66 is then slipped between the glass and the edge of the window frame and the stop nuts 74 and 76 adjusted to maintain the container 10 in rigid relation with respect to the door.

When the device is to be mounted into a conventional window 80 a telescoping base is provided having an outer slide member 84 and an inner slide member 86. The outer member 84 is of sufficient size to snugly fit within the usual slide channel 88 of a window frame and be snugly received therein. The bottom portion of the outer telescoping member 84 is provided with external lugs 90 and internal lugs 92 which are provided in offset relation to the member 84 and is provided with a set screw 94 having a wing nut head 96. The inner telescoping member 86 is likewise provided with external lugs 98 and with two or more internal lugs 92. Telescopic members 84 and 86 are provided with a longitudinal slot 100 through which the diffusing chamber 50 will extend.

In localities where there will not be sufficient natural breeze to contact the wind scoop 44 and supply air through the conduit 40 a suitable impeller may be mounted adjacent the wind scoop and driven by a suitable device such as the electric motor 104. The motor 104 driving a fan (not shown) which is enclosed in a shroud ring 106 which is substantially of the diameter of the container 10 so that it may substantially abut the end thereof so that the breeze produced by the fan driven by the motor 104 may substantially all pass into the wind scoop 44 and through the conduit 40 and so through the diffusing chamber 50 into the interior of the place to be cooled.

In the utilization of the cooler according to the invention the container 10 is mounted on the exterior of the window and filled with a suitable fluid which is readily evaporatable such as water so that the evaporation of the fluid from the external surface of the container will maintain the water in the container at a low temperature. Where there is a natural flow of air or where it is mounted on a vehicle so that the vehicle will create an artificial air stream the air scoop 44 directs air into the canvas conduit 40 and evaporates moisture from the inner surface of the conduit and also transfers heat into the water within the container so that the air passing through the conduit is cooled to a relatively low temperature. The cooled air passes into the outlet housing 48 and through the diffusing chamber 50 into the space to be cooled. The louvers 52 may be adjusted in any desired manner either to close the opening of the diffusing chamber 50 or to direct the flow of air through the diffusing chamber in any desired direction. When the device is used in a locality where there is no water pressure or running water the reservoir will be used and filled with a desired coolant fluid so that the container 10 will be substantially constantly filled throughout the cooling period. On the other hand when a supply of water is available it is not necessary to provide the reservoir 16 although it may be used if desired. Water from the pressure source is conducted through the conduit 24 and the amount of water controlled by the valve 32. As the amount of water evaporated from the container 10 depends primarily on the humidity and temperature of the air to which it is subjected there may be an uneven flow of water through the container, for that reason an overflow outlet 110 is preferably provided having cap 20 through which the pressure line 24 is connected into the container 10.

It will thus be apparent that the present invention provides an air cooler utilizing the outside hot air as a cooling medium by evaporating a fluid from the surface of a substantially porous or semi-porous container. It likewise is apparent that the device may be utilized with or without an impeller to force air into the air scoop depending upon the conditions under which it is installed.

For purposes of exemplification preferred embodiments of the invention have been shown, and described according to the best present understanding thereof. However, it will be apparent to those skilled in the art that changes and modifications can be made therein without departing from the true spirit of the invention.

Having described the invention, what is claimed as new is:

An air cooler comprising an elongated container of a pliable, porous material, means for supplying water into said container, substantially the entire exterior surface of the container being surrounded by the atmosphere for evaporation of water passing through the porous material whereby to cool the water in the container, an air conduit of a pliable porous material extending through said container and being directly contacted and surrounded by the water in the container, a reinforcing, stiffening and distending member in said conduit, a funnel-shaped air intake for said conduit, means for discharging cooled air from an end of said conduit, reinforcing means in said container in longitudinally extended position therein and surrounding said conduit for holding the pliable material of the container in distended position and imparting rigidity thereto, said discharge means including an elongated housing extending parallel to the container, said housing having an elongated discharge opening in a wall thereof opposite to that facing the container, said discharge means further including a pipe communicating with one end of said air conduit and extending through an end of the container and thence across said end and entering into the end of the housing and communicating with the interior thereof for discharging cooled air from the conduit in the container into the interior of the housing.

References Cited in the file of this patent

UNITED STATES PATENTS

| Number | Name | Date |
| --- | --- | --- |
| 1,362,649 | Taylor | Dec. 21, 1920 |
| 1,579,560 | Moore | Apr. 6, 1926 |
| 2,009,550 | Harris | July 30, 1935 |
| 2,048,694 | Harris | July 28, 1936 |
| 2,124,137 | Christian | July 19, 1938 |
| 2,435,798 | Rice et al. | Feb. 10, 1948 |